(12) United States Patent
Salot et al.

(10) Patent No.: US 8,778,532 B2
(45) Date of Patent: Jul. 15, 2014

(54) ENCAPSULATED LITHIUM ELECTROCHEMICAL DEVICE

(75) Inventors: Raphaël Salot, Lans-en-Vercors (FR); Steve Martin, St Sauveur (FR); Sami Oukassi, Bizerte (TN)

(73) Assignees: Commissariat à l'Energie Atomique, Paris (FR); ST Microelectronics SA, Montrouge (FR)

( * ) Notice: Subject to any disclaimer, the term of this patent is extended or adjusted under 35 U.S.C. 154(b) by 855 days.

(21) Appl. No.: 12/269,486

(22) Filed: Nov. 12, 2008

(65) Prior Publication Data

US 2009/0155685 A1 Jun. 18, 2009

(30) Foreign Application Priority Data

Dec. 12, 2007 (FR) ...................... 07 59792

(51) Int. Cl.
*H01M 2/08* (2006.01)
*H01M 2/02* (2006.01)
*H01M 8/02* (2006.01)

(52) U.S. Cl.
CPC ............ *H01M 8/028* (2013.01); *H01M 8/0286* (2013.01)
USPC ............................. 429/185; 429/184; 429/181

(58) Field of Classification Search
USPC ............ 429/185, 124, 231.95, 123, 125, 126, 429/127, 162
See application file for complete search history.

(56) References Cited

U.S. PATENT DOCUMENTS

| | | | | |
|---|---|---|---|---|
| 5,561,004 A | * | 10/1996 | Bates et al. | 429/162 |
| 5,654,084 A | * | 8/1997 | Egert | 428/215 |
| 6,610,440 B1 | * | 8/2003 | LaFollette et al. | 429/122 |
| 2004/0029311 A1 | | 2/2004 | Snyder et al. | |
| 2004/0043289 A1 | * | 3/2004 | Shimamura et al. | 429/162 |
| 2005/0001214 A1 | | 1/2005 | Brun et al. | |
| 2006/0286448 A1 | | 12/2006 | Snyder et al. | |
| 2007/0067984 A1 | | 3/2007 | Gaillard et al. | |

FOREIGN PATENT DOCUMENTS

| | | |
|---|---|---|
| FR | 2831327 | 4/2003 |
| FR | 2862437 | 5/2005 |

OTHER PUBLICATIONS

K. Marquardt et al., Assembly and Hermetic Encapsulation of Wafer Level Secondary Batteries Article, MEMS 2006, Istanbul, Turkey, Jan. 22-26, 2006, pp. 954-957.
Republic of France International Search Report dated Sep. 8, 2008 (2 pgs.).

* cited by examiner

*Primary Examiner* — Zachary Best
*Assistant Examiner* — Jennifer Rea

(57) ABSTRACT

This lithium electrochemical device includes a stack of layers suitable for constituting a micro-battery deposited on a substrate and encapsulated using a protective cap sealed onto the substrate. It includes two collectors of the current generated by the micro-battery and at least one insulating layer inert as regards lithium. The collectors and the insulating layer or layers are deposited on the substrate. The protective cap is sealed onto the substrate using the layers constituting the current collectors and the insulating layer or layers. The cap has layers of the same nature, positioned in the same order in line with their respective layers deposited on the substrate, so that when the cap is sealed onto the substrate, the respective layers deposited on the cap and on the substrate come into contact with each other to provide the actual seal of the cap on the substrate.

11 Claims, 5 Drawing Sheets

ENCAPSULATED LITHIUM ELECTROCHEMICAL DEVICE

CROSS REFERENCE TO RELATED APPLICATIONS

This application claims priority under 35 U.S.C. §119 from French Patent Application No. 0759792 filed on Dec. 12, 2007 in the French Patent Office, the entire disclosure of which is incorporated herein by reference.

FIELD OF THE INVENTION

The invention relates to the field of lithium electrochemical devices, and more particularly to lithium micro-batteries obtained by the deposition of thin films using vacuum deposition technology.

These micro-batteries are employed most especially in chip cards, smart labels (recurring parameter measurement by miniature implants), supplying power to internal clocks and Micro Electro Mechanical Systems (or MEMS).

BACKGROUND OF THE INVENTION

Lithium micro-batteries are well known today. They conventionally comprise a substrate on which a stack is deposited comprising successively a cathode, an electrolyte comprising lithium, and an anode generally made of metallic lithium, the unit so formed being covered by a protective housing in order to prevent any contamination from outside.

These micro-batteries, implemented in the form of thin films using microelectronics technology, are therefore implemented using lithium-based materials, which are especially sensitive to the external environment, and above all to moisture, and to the oxygen and nitrogen present in the ambient air. The protection they are given against these different agents is the decisive factor in respect of their durability.

The operating principle of these cells hinges on the insertion and disinsertion (or intercalation-disintercalation) of an alkali metal and typically lithium ion into the positive electrode. The principal micro-battery systems use the lithium ion $Li^+$ from a metallic lithium electrode as the ion species. The different components of such a micro-battery, whether it be the current collectors, the positive or negative electrodes, the electrolyte or the protective layer also known as the encapsulation layer, are presented in the form of thin layers obtained by Physical Vapor Deposition (PVD) or Chemical Vapor Deposition (CVD). The total thickness of the stack is typically about 15 μm.

The nature of these different components may be as follows:

The collectors: these are metallic in nature, constituted for example of platinum, chromium, gold, titanium, tungsten or molybdenum.

The positive electrode: this may be made of $LiCoO_2$, $LiNiO_2$, $LiMn_2O_4$, $CuS$, $CuS_2$, $WO_yS_z$, $TiO_yS_z$, $V_2O_5$. Depending on the material selected, a thermal annealing operation may prove necessary in order to improve film crystallization and their insertion property within the stack. This is especially true of lithium oxides. However, some amorphous materials, and particularly titanium oxysulfides ($TiO_yS_z$), do not need to be treated in this way while allowing a high level of $Li^+$ lithium ion insertion.

The electrolyte: this must be a good ion conductor but an electronic insulator. Most of the time, a vitreous material is employed based on boron oxide, lithium oxide or lithium salt. The most effective electrolytes are phosphate based, and especially LIPON (lithium compound based on lithium phosphorus oxynitride) or LISIPON (lithium compound based on lithium phosphorus and silicon oxynitride);

The negative electrode: this must be constituted of metallic lithium deposited by thermal evaporation, or a lithium-based metal alloy or again an insertion compound ($SiTON$, $SnN_x$, $InN_x$, $SnO_2$ etc.).

The encapsulation layer: the purpose of this, as already stated, is to protect the active stack constituting the microbattery from the external environment and specifically from moisture.

This encapsulation may be the outcome of two different technologies:

Under a first technology, this encapsulation is implemented on the basis of thin layers. A stack of layers is thus generally employed in a vertical alternation of different layers in order to optimize the barrier properties of the unit. The most commonly adopted strategy involves depositing a pre-encapsulation by means of a layer that is inert as regards lithium and planarizing. The conventionally used material is a polymer, in the case in point parylene. The barrier function may be reinforced through the deposition of other layers, in particular metals or organosilicons.

This technology comes up against a problem of limited durability. Indeed, because of the permeation of gases through the encapsulation so implemented, as well as the mechanical stresses sustained by the encapsulation during the electrochemical cycling of the micro-batteries (volume changes), the lithium is affected, and it oxidizes quite quickly as a result.

Under a second technology, encapsulation is implemented by capping: a layer of epoxy is deposited on the edge of the element to be protected. This allows a glass cap to be bonded by exposure to ultraviolet radiation. The cap-to-substrate seal can be implemented using a number of methods and may involve the use of different materials, either metals, or dielectrics.

It can be seen therefore that this technology requires the deposition of a sealing layer to anchor the cap onto the substrate. This layer is not however generally optimized in respect of barrier properties, particularly as regards moisture but also oxygen and nitrogen. Moreover, the seal in use comes up against outflow problems in relation to the current collectors from the cavity comprising the micro-battery. In fact a non-metallic seal has to be used, at the very least in proximity to the collectors in order to prevent short-circuiting. Yet metallic materials have proved to be the materials that have the best barrier effect with the result that the problem can easily be imagined, in so far as it is necessary to make do with an unsatisfactory barrier effect. In fact, the use of a metallic seal is only possible in the event of the micro-battery being connected vertically, in other words through the rear surface of the substrate. But this solution requires additional technological steps that are highly complex to apply, and thereby raise the implementation costs.

The objective set by the present invention is to provide an encapsulation for such micro-batteries that is not only efficient in terms of barrier effect, but also employs a widely mastered implementation technology and especially requires no additional steps for the deposition of a seal-specific material.

The invention implements the technology of encapsulation by capping.

SUMMARY OF THE INVENTION

The present invention therefore relates to a lithium electrochemical device that comprises a stack of layers suitable for constituting a micro-battery deposited on a substrate and encapsulated using a protective cap sealed onto said substrate. This device is supplied with two collectors of the current generated by the micro-battery and at least one insulating layer inert as regards lithium, deposited on said substrate.

According to the invention, the protective cap is sealed onto the substrate using the layers constituting the current collectors and the insulating layer or layers, said cap receiving layers of the same nature, positioned in the same order in line with the relevant layers deposited on the substrate, so that when the cap is sealed onto the substrate, the respective layers deposited on the cap and on the substrate come into contact with each other in order to provide the actual seal of the cap on the substrate.

In doing this, through this special architecture, a double barrier is provided constituted both by the inert insulating material and the conductive material.

According to one advantageous feature, the seal is the result of an alternation of strips made of an insulating material and a conductive material, said strips themselves being the result of sealing the layers provided on the substrate and on the cap respectively.

According to another advantageous feature of the invention, at least one of the strips made of insulating material is defined and delimited by two parallel strips of conductive material.

According to another feature of the invention, additional strips of conductive material are added thereby extending between the substrate and the cap, in such a way as to lengthen the potential diffusion path for external gases and moisture.

To advantage, the mechanical performance of the assembly is optimized by the prior deposition of a primer layer deposited on the cap and on the substrate respectively, prior to the deposition of the insulating layer, this primer layer being of the organosilicon type and obtained through the deposition of thin layers using CVD technology.

To advantage, the assembly also comprises a getter intended to trap any oxygen and moisture that might penetrate into the cavity thereby allowing the durability of the unit to be increased. This getter may be constituted of metallic lithium.

BRIEF DESCRIPTION OF THE DRAWINGS

The way in which the invention can be implemented and the advantages arising therefrom will emerge more clearly from the following embodiment examples, given by way of illustration and non-restrictively, reference being made to the appended figures.

DETAILED DESCRIPTION OF THE INVENTION

Figure 1A:
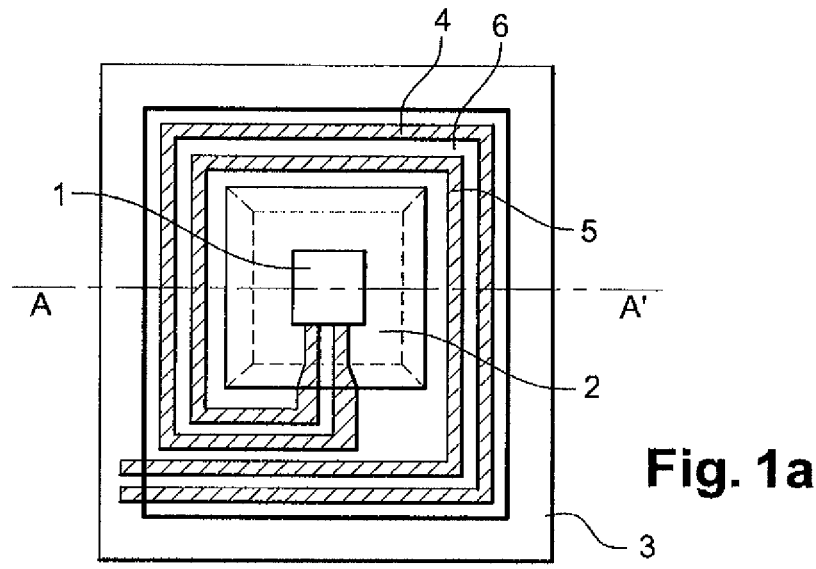
FIG. 1A is a diagrammatic representation seen from above of the inventive assembly, with FIG. 1B being a diagrammatic representation in cross-section along the line AA' in FIG. 1A.
Figure 1B:
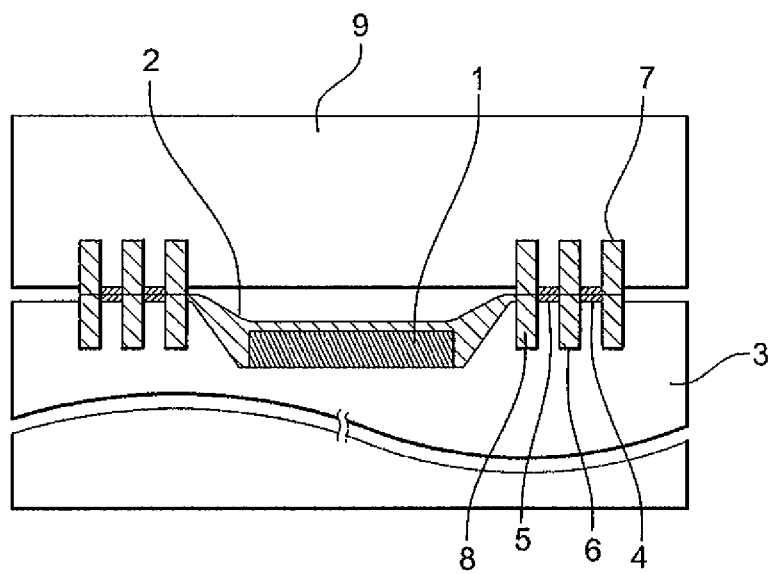

The general principle underpinning the present invention has thus been shown in relation to FIGS. 1A and 1B.

In FIG. 1A, in a view from above, has been shown the substrate 3 defining a cavity 2 in which has been positioned the stack constituting a lithium micro-battery 1. A stack of this kind is well known in the prior art, and so it will not be described in detail here.

The reference numbers 4 and 5 have been used to denote the two collectors of the current emanating from the micro-battery 1, and intended to allow the current generated by the micro-battery to flow out from the assembly. In the case in point, the two conductors form a spiral surrounding the micro-battery 1.

The assembly in FIG. 1A has been shown in FIG. 1B in transverse cross-section. In it can be seen a protective cap 9 sealed onto the substrate 3 on the periphery of the cavity 2 receiving the micro-battery 1.

This sealing occurs, in accordance with the invention, on the one hand via the layers constituting the current collectors 4 and 5, and on the other hand via several pre-encapsulation layers 6, 7 and 8 respectively, with an alternation of the conductive layers constituting the current collectors and of the insulating layers constituting the pre-encapsulation layers, as can be seen properly in FIG. 1B.

To this end, and as described subsequently in greater detail, on the cap is deposited, prior to it being positioned and therefore prior to it being sealed onto the substrate 3, an alternation of said layers so as to allow them to be positioned in line with the layers provided on the substrate 3 during the assembly itself.

Because of this particular architecture, and especially the use of this alternation of insulating layers and conductive layers, the diffusion path and therefore the diffusion length of any oxidizing entities reaching the micro-battery, particularly oxygen, water vapor, and even nitrogen, is significantly increased. The quality of the barrier effect resulting from this encapsulation is thus significantly increased.

Moreover, given the twofold nature of this sealing, metal to metal and dielectric to dielectric respectively, an optimization of this barrier effect is achieved, since as specified in the introduction, the metal to metal seal proves to be more effective in fighting against the intrusion of said oxidizing entities. Moreover, a single thermal annealing operation proves to be enough to implement the assembly: the temperatures used allow both the formation of a eutectic and a bond in the metallic and dielectric area of the seal respectively.

Figure 3A:
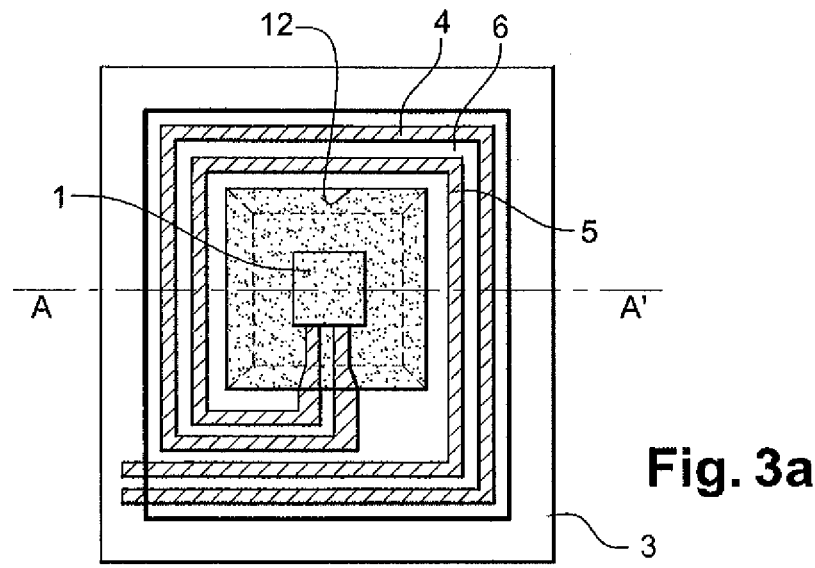
FIGS. 3A and 3B are views similar to FIGS. 1A and 1B of another embodiment of the invention employing a getter.
Figure 3B:
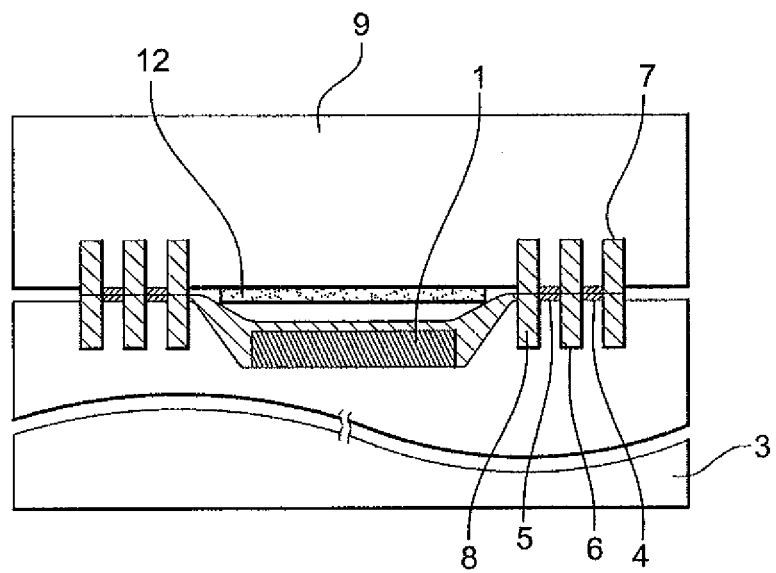

To advantage, and according to an embodiment shown in relation to FIGS. 3A and 3B, in the assembly is added a getter 12, itself constituted for example of lithium. This getter is positioned on the inner surface of the cap 9, before it is sealed onto the substrate 3. By doing this, it is possible to activate it thermally, without any risk of affecting the stack constituting the micro-battery.

This quantity of additional lithium constituting the getter is quite obviously not intended for the operation of the micro-battery 1. On the other hand, it does allow the durability of the micro-battery to be increased, because its consumption (oxidation) by the oxidizing entities takes precedence over the consumption of the lithium constituting said micro-battery.

Thus, to provide ten years of durability, knowing lithium oxidation reaction kinetics, a thickness of the getter 12 of 2 μm is sufficient.

Furthermore, given the permeation of parylene, the material to advantage constituting the pre-encapsulation layer, i.e. the dielectric layer alternating with the metallic conductor layers, if ten years of durability is to be guaranteed for said micro-battery, a diffusion path of about 25 mm must be provided.

But, in some cases, the greatest possible effort is made to reduce the lateral dimensions of the micro-battery, and therefore of the assembly receiving it, so as to allow it to be integrated into devices that are also of small overall dimensions.

To this end, according to one inventive alternative, strips of conductive materials 10, 11 are added, inducing an increase in the length of the diffusion path of the oxidizing entities.

Figure 2A:
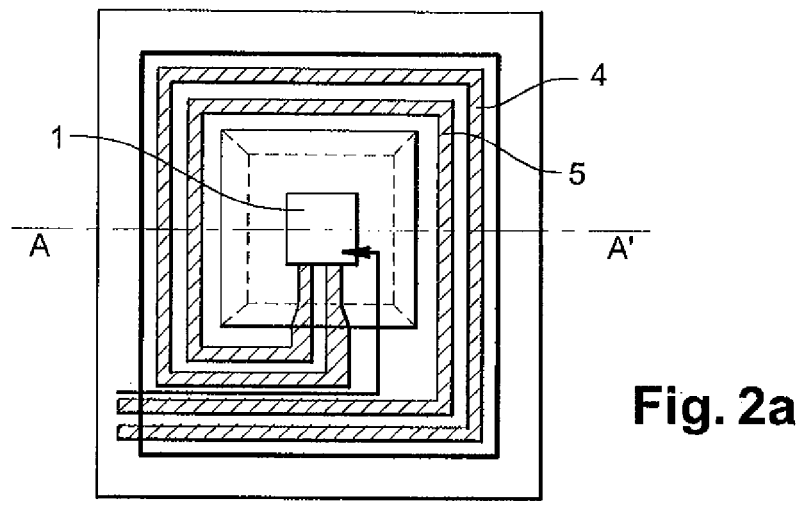
FIGS. 2A, 2B, 2C show the insertion modes of the outside gases and moisture that may be involved, FIGS. 2B and 2C showing alternative embodiments of the invention that allow the diffusion path of these entities to be increased.
Figure 2B:
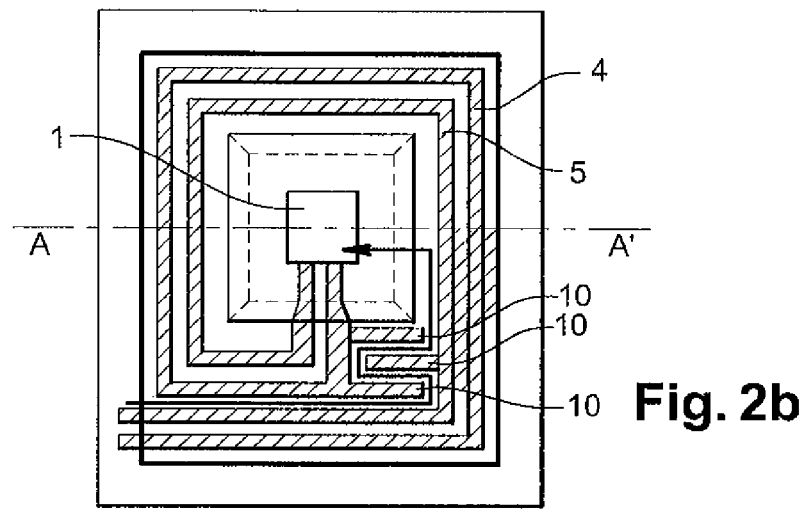
Figure 2C:
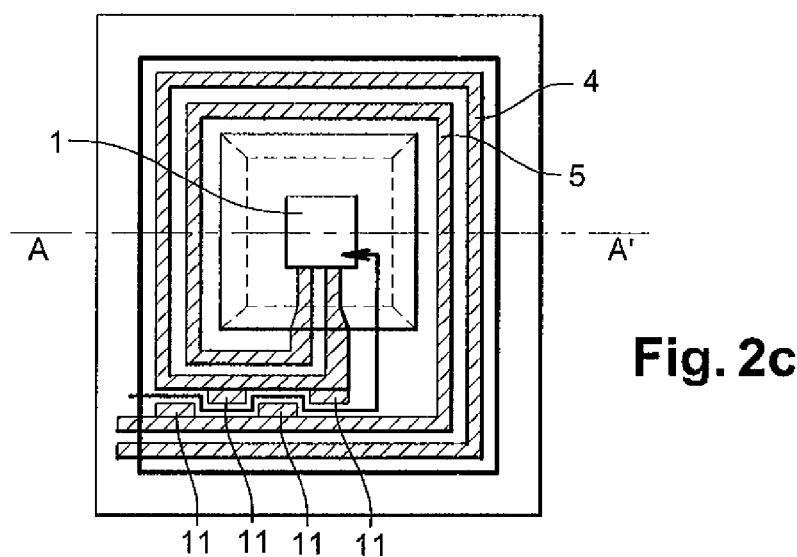

This diffusion has thus been shown in FIGS. 2A, 2B and 2C, symbolized in each of these figures by an arrow. It can thus be seen, that by adding said strips of conductive materials 10, 11, which, like those constituting the electric collectors 4 and 5, extend between the substrate and the cap, such that no short-circuit is induced between the two collectors 4 and 5, baffles are created that significantly increase a diffusion path of this kind (see FIGS. 2B and 2C). This architecture means that reducing the size of the assembly can be reconciled with optimizing the durability of the micro-battery it contains.

According to one advantageous feature of the invention, and in order to optimize the mechanical performance of the assembly and therefore the sealing of the cap onto the substrate, a deposition is made prior to the deposition of the layer of dielectric material, in particular of parylene, of a so-called primer layer (not shown), and for example of the organosilicon type. This deposition is obtained using the Plasma Enhanced Chemical Vapor Deposition (PECVD) technique.

Some micro-batteries are able not to comprise a metallic anode. These are commonly said to be "Li free". In this case, a layer of metal blocking the lithium is deposited, the lithium then being deposited on this layer. When charging, the lithium migrates from the positive electrode to the metal, and is electrodeposited thereon to form a layer of lithium acting as negative electrode. When discharging, the migration works in the reverse direction, namely from the electrodeposited lithium layer to the positive electrode.

In this event, it is possible to employ higher temperatures to perform the sealing operation. Thus, recourse may be made to the following binary pairs listed in Table 1 below,

| | Diffusion couples | | | | | |
|---|---|---|---|---|---|---|
| | In/Sn | PPX/PPX | Au/In | Sn/Ag | Au/Sn | Au/Si |
| Composition (by weight %) | 52/48 | 1/1 | 33/66 | 95/5 | 80/20 | 80/20 |
| Sealing temperature (° C.) | 140 | 150 | 180 | 221 | 240 | 365 |

A table in which PPX denotes parylene.

Figure 4A:
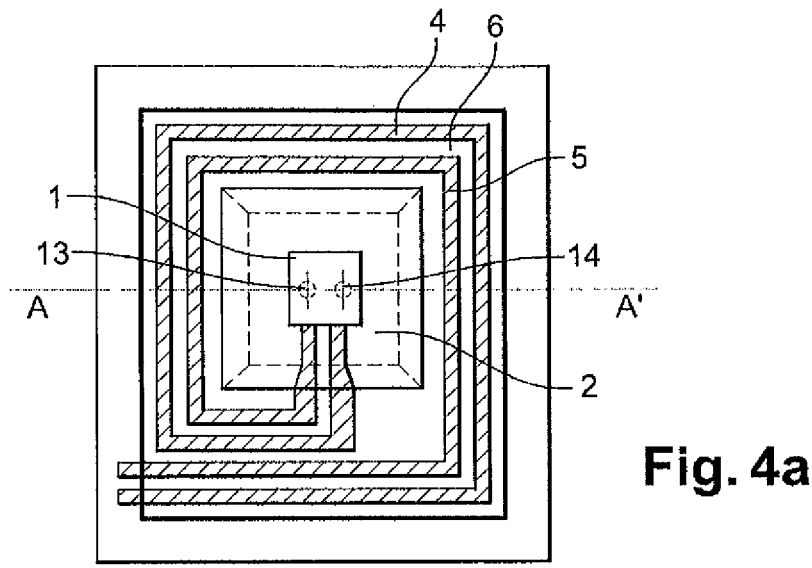
FIGS. 4A and 4B show the invention respectively seen from above and seen in transverse cross-section along the line AA' with connection of the micro-battery via the posterior surface through the substrate.
Figure 4B:
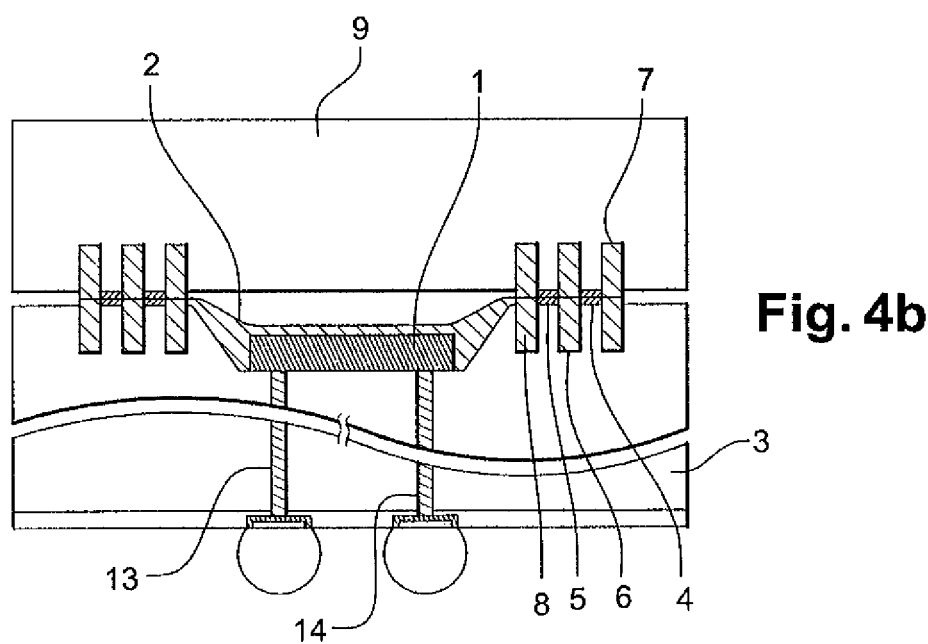

According to another feature of the invention, it is also conceivable, and in a known way, for the electrical connection of the micro-battery 1 to be provided on the rear surface of the substrate, as shown in FIGS. 4A and 4B. In this, the electrical collectors 13 and 14 pass through the substrate so as to be connected to the connection points, of a microactivator, for example, which the micro-battery is intended to operate. This does not in any way challenge the sealing principle of the present invention.

Figure 5:
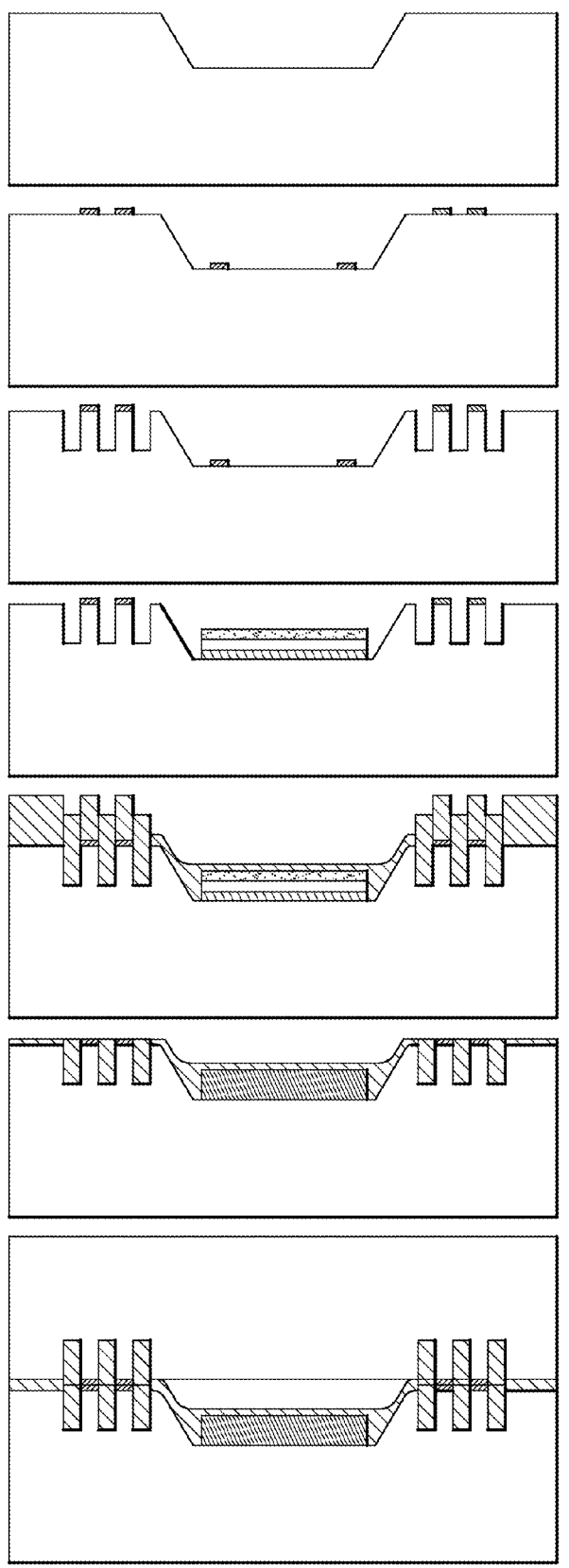
FIGS. 5A to 5G show a possible embodiment of the inventive assembly.

Different steps that can then be taken to produce the assembly in accordance with the present invention have been shown in FIG. 5.

FIG. 5A: to start with, there is a substrate, constituted for example of silicon and possibly coated with a $SiO_2+Si_3N_4$ passivation layer.

This substrate is etched, for example by potassium hydroxide KOH, in order to define a cavity 2 intended then to receive the micro-battery itself.

FIG. 5B: Current collectors, constituted for example of a (50/200 nm) Ti/Au layer are then deposited by "patterning", implemented for example by mechanical masking or by photolithography and then etching, on the bottom of said cavity, and on the periphery thereof.

FIG. 5C: The next step is to etch the substrate, for example by deep ion etching, by ion beam etching, or by KOH wet etching, defining a certain number of grooves intended subsequently to receive the parylene, without however affecting the areas in which the collectors are deposited.

FIG. 5D: The next step is then to deposit the stack constituting the micro-battery itself, and to do so by patterning, as described above.

This battery is for example TiOS (2 μm)/Lipon (1.5 μm)/Li (3 μm). Alternatively, this microbattery may be $LiCoO_2$ (2 μm)/Lipon (1.5 μm)/Ge (100 nm).

FIG. 5E: A pre-encapsulation layer constituted of parylene is then deposited, by PVD or CVD. This deposition is applied on the one hand within the grooves produced at the step in FIG. 5C, on the other hand on the micro-battery. Since this deposition is conformal, the projections are retained.

FIG. 5F: A chemical mechanical polishing operation is applied to the free surface of the substrate, to planarize the surface and to level the layers of parylene and metal.

FIG. 5G: The cap is then applied and sealing is carried out.

Identical operations are also performed on the inner surface of the cap 9, so as to make the areas coated with parylene and conductive material respectively coincide with the corresponding areas of the substrate during the subsequent assembly of said cap on the substrate.

The cap may be constituted of a silicon substrate comprising layers of parylene 5 μm thick and of indium 1 μm thick, deposited, as already stated, on the inner surface. The indium may be replaced for example by tin.

Bonding is performed at 180° C. at 1.8 MPa of pressure for 30 minutes where TiOS (2 μm)/Lipon (1.5 μm)/Li (3 μm) is used for the stack.

In the event of the stack being constituted of $LiCoO_2$ (2 μm)/Lipon (1.5 μm)/Ge (100 nm), i.e. using "Li free" technology, bonding is performed by In/Au solid phase diffusion at 240° C., made possible in this case by the absence of metallic lithium.

The inventive method and assembly present a certain number of advantages compared with the prior art. Thus, and particularly where a micro-battery is implemented that comprises a metallic lithium negative electrode, i.e. with a low melting point and highly sensitive to the atmosphere, the invention makes it possible to obtain:

A battery protected mechanically on the one hand, and on the other hand against the atmosphere by a cap made of a material able to be selected from a wide range: silicon, glass, ceramic etc.

Capping can be performed at low temperature, at all events compatible with the melting point of lithium and compatible with technologies in respect of flexible substrates, for example of the polyimide or polyethylene terephthalate (PET) type, or in respect of hard thinned down substrates of the silicon type;

The materials employed for the sealing demonstrate an efficient barrier effect against the oxidizing entities, able to optimize the durability of the micro-batteries;

The encapsulation method further allows an expansion volume to be defined in the cavity 2 allowing the volume changes related to battery operation (charge-discharge cycle);

furthermore this volume allows the implementation of a getter material, particularly on the inner surface of the cap, trapping the oxygen or moisture able to penetrate into the cavity and as a consequence increasing the durability of the micro-battery. Moreover, this getter material may where necessary be thermally activated prior to the bonding step, since it is still integrated with the cap.

We claim:

1. A lithium electrochemical device comprising a stack of layers suitable for constituting a micro-battery deposited on a substrate and encapsulated using a protective cap sealed onto said substrate, the device comprising:
   said substrate comprising two current collector strips constituted of an electrically conductive material and at least one insulating strip constituted of an insulating material that does not react with lithium; and
   said protective cap comprising an inner surface that comprises two current collector strips constituted of the electrically conductive material and at least one insulating strip constituted of the insulating material,
   wherein the current collector strips and the at least one insulating strip on said cap are positioned to respectively coincide with the current collector strips and the at least one insulating strip on the substrate, so that when the cap is sealed onto the substrate, the respective strips deposited on the cap and on the substrate come into contact with each other providing the actual seal of the cap on the substrate, and
   wherein the respective strips deposited on the cap and on the substrate are arranged to form a spiral surrounding said micro-battery.

2. The lithium electrochemical device as claimed in claim 1, wherein additional strips made of conductive material extend between the substrate and the cap, so as to lengthen a potential diffusion path of external gases and moisture to within the device.

3. The lithium electrochemical device as claimed in claim 1, wherein a primer layer is previously deposited on the cap and on the substrate respectively, prior to the deposition of the insulating strips.

4. The lithium electrochemical device as claimed in claim 3, wherein the primer layer is an organosilicon and is obtained by deposition of thin layers using chemical vapor deposition technology.

5. The lithium electrochemical device as claimed in claim 1, wherein it comprises a getter, intended to trap any oxygen and moisture that might penetrate into a cavity defined by the protective cap and the substrate.

6. A lithium electrochemical device comprising a stack of layers suitable for constituting a micro-battery deposited on a substrate and encapsulated using a protective cap sealed onto said substrate, the device comprising:
   said substrate comprising two current collector strips constituted of an electrically conductive material and at least one insulating strip constituted of an insulating material that does not react with lithium, one of the two current collector strips on said substrate being associated with an opposite pole of the battery from the other current collector strip on said substrate; and
   said protective cap comprising an inner surface that comprises two current collector strips constituted of the electrically conductive material and at least one insulating strip constituted of the insulating material, one of the two current collector strips on said cap being associated with an opposite pole of the battery from the other current collector strip on said cap,
   wherein the current collector strips and the at least one insulating strip on said cap are positioned to respectively coincide with the current collector strips and the at least one insulating strip on the substrate, so that when the cap is sealed onto the substrate, the respective strips deposited on the cap and on the substrate come into contact with each other providing the actual seal of the cap on the substrate.

7. The lithium electrochemical device as claimed in claim 6, wherein additional strips made of conductive material extend between the substrate and the cap, so as to lengthen a potential diffusion path of external gases and moisture to within the device.

8. The lithium electrochemical device as claimed in claim 6, wherein a primer layer is previously deposited on the cap and on the substrate respectively, prior to the deposition of the insulating strips.

9. The lithium electrochemical device as claimed in claim 6, wherein it comprises a getter, intended to trap any oxygen and moisture that might penetrate into a cavity defined by the protective cap and the substrate.

10. The lithium electrochemical device as claimed in claim 9, wherein the getter is constituted by metallic lithium.

11. The lithium electrochemical device as claimed in claim 9, wherein the getter is positioned on the inner surface of the protective cap, prior to the latter being sealed onto the substrate.

* * * * *